March 10, 1970

L. I. LINKOW ET AL 3,499,222

INTRA-OSSEOUS PINS AND POSTS AND THEIR
USE AND TECHNIQUES THEREOF

Filed Aug. 17, 1965

INVENTORS.
LEONARD I. LINKOW
ALFRED E. EDELMAN

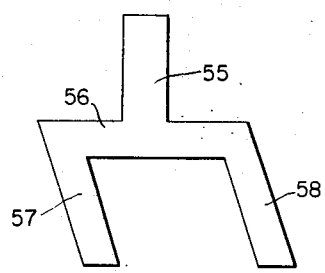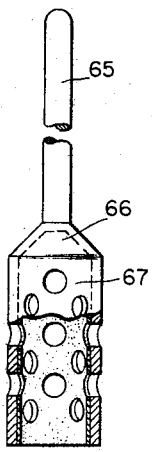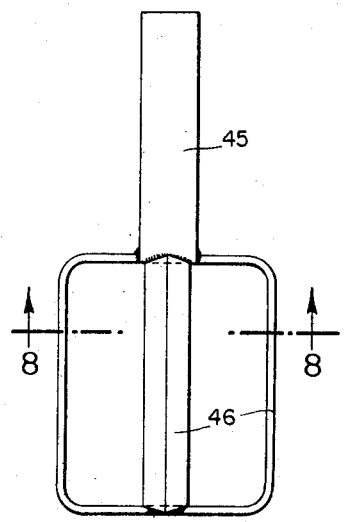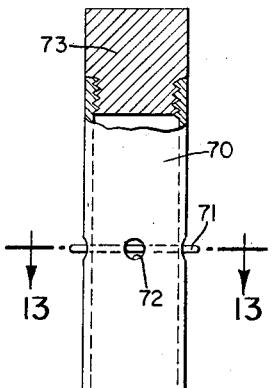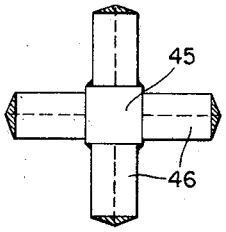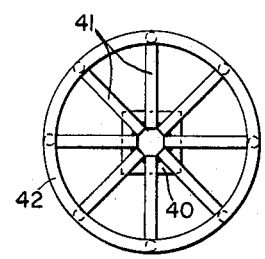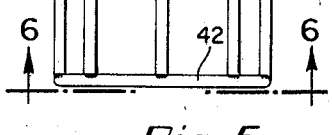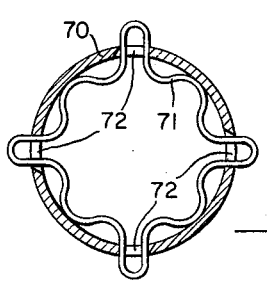

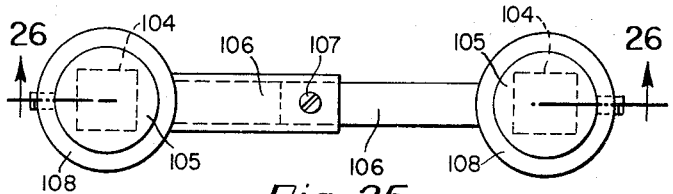
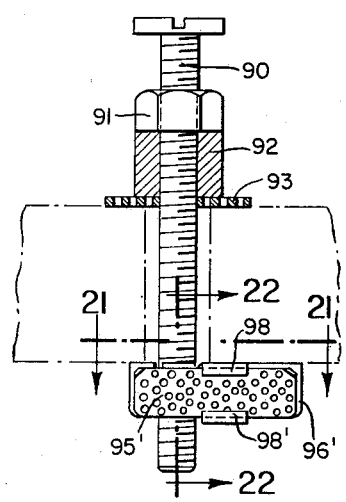
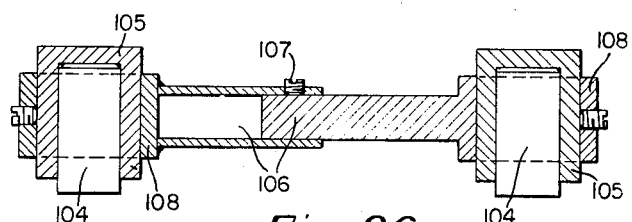
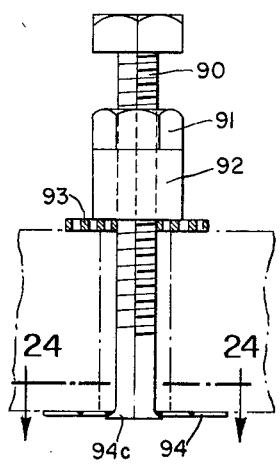
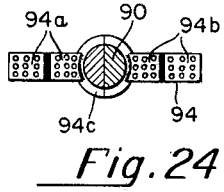
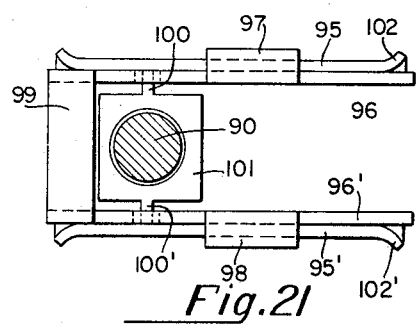
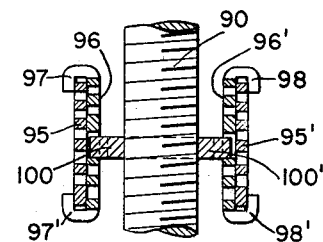
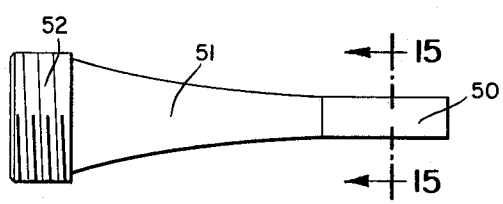
INVENTORS.
LEONARD I. LINKOW
ALFRED E. EDELMAN

United States Patent Office

3,499,222
Patented Mar. 10, 1970

3,499,222
INTRA-OSSEOUS PINS AND POSTS AND THEIR USE AND TECHNIQUES THEREOF
Leonard I. Linkow, 591 Park Ave., Cedarhurst, N.Y. 11516, and Alfred E. Edelman, 2723 Federal St., Camden, N.J. 08105
Filed Aug. 17, 1965, Ser. No. 480,367
Int. Cl. A61c 13/22
U.S. Cl. 32—2                                      9 Claims

ABSTRACT OF THE DISCLOSURE

The disclosure relates to dental implants and more particularly to intra-osseous pins and posts and splints for joining implant parts and methods and techniques for their use. The implants include corona portions preferably of polygonal configuration and intra-osseous portions shaped to facilitate penetration into the jaw bone of a patient and also designed to prevent undesired removal of the implant once it has been driven into and anchored in place in the jaw bone.

This invention relates to improvements in implant dentistry. More particularly, the invention relates to intra-osseous pins and posts and to improved techniques for their clinical employment in fixed oral reconstruction.

In the prior art practice of dentistry a preliminary to the provision of fixed bridgework is the consideration of abutment teeth to anchor the prosthesis and afford the stabilization and support essential to proper oral functioning. Where the patient is wholly lacking in abutment teeth or where oral conditions due to age or trauma are such as to negative consideration thereof as an anchoring medium, the prospect of fixed bridgework as a remedial measure is dimmed. In some cases resort may be had to modifications of fixed bridgework exhibiting a greater degree of sophistication. Illustrative of the latter are cantilever bridges including unilateral and bilateral partial dentures. However, the cantilever bridge has the inherent disadvantage of limited application and limited rigidity.

Relatively recent approaches to the problems attendent the provision of anchoring means for fixed bridgework have been taken in the so-called "implant" dentistry field. In this regard, however, successful implantation has been limited to that of the subperiosteal type. The technique therefor is involved due to the extreme difficulty in obtaining an adequate cortical bone impression prior to surgical separation of the periosteum from the alveolar bone. Of necessity, highly skilled and trained technicians are required. At least two visits to the dentist by the patient are required with a minimum three week interval therebetween. Consequent post operative sutures and swelling are the rule. Further, the subperiosteal technique is not available in the majority of cases where alveolar bone is present in substantial amounts.

Accordingly, a principal object of the invention is to provide improved implant prostheses for use in fixed oral reconstruction which are unattended by the foregoing disadvantages of the prior art.

Another object of the invention is to provide improved intra-osseous pins and posts for fixed oral reconstruction.

Still another object of the invention is to provide improved techniques for the clinical employment of implant prostheses in fixed oral reconstruction.

Other objects of the invention will be obvious to those skilled in the art from the disclosure appearing hereinafter and the drawings forming a part thereof, wherein:

FIGS. 1 and 3 depict embodiments of inventive implant posts;

FIGS. 2 and 4 depict cross-sectional views thru 2—2 of FIG. 1 and 4—4 of FIG. 3, respectively;

FIGS. 5 and 7 depict embodiments of inventive implant posts suitable for use in fresh extraction cases;

FIGS. 6 and 8 depict cross-sectional views thru 6—6 of FIG. 5 and 8—8 of FIG. 7, respectively;

FIG. 9 depicts an embodiment of an inventive implant post for cuspid replacement;

FIG. 10 depicts an embodiment of an inventive implant post which is a modification of that depicted in FIG. 3;

FIGS. 11 and 12 depict embodiments of inventive hollow cylindrical implant posts for retaining an axial core of alveolar bone;

FIG. 13 depicts a cross-sectional view thru 13—13 of FIG. 12;

FIG. 14 depicts modification of an inventive implant post suitable for fresh extraction cases;

FIG. 15 depicts a cross-sectional view thru 15—15 of FIG. 14;

FIGS. 20 and 23 depict inventive implant posts particularly suited for undercut bone;

FIGS. 21, 22 and 24 depict cross-sectional views thru 21—21 of FIG. 20, 22—22 of FIG. 20 and 24—24 of FIG. 23, respectively, and FIGS. 25 and 26 depict top and side views, respectively, of telescoping splints for use with implant post copings.

Figure 1:
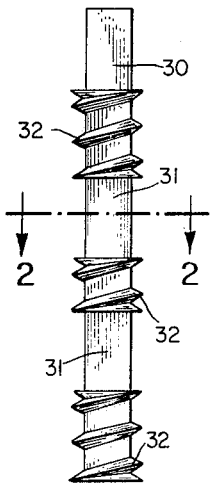
Figure 2:
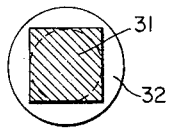

Referring to FIGS. 1 and 2 it may be seen that one embodiment of the present invention contemplates an implant post provided with a coronal portion 30 for projection beyond the alveolar ridge and a shaft for penetration into the alveolar ridge comprising shank portions 31 and threaded portions 32. Coronal portion 30 and shank portions 31 may be of any cross-sectional configuration which will oppose rotation after implantation and bone regeneration, the preferred configuration being polygonal, such as square or hexagonal. Threaded portions 32 should contain no more than 3 threads per portion with adequate spacing between threads as to be compatible with bone regeneration. A preferred spacing is one-sixteenth of an inch. It is also contemplated to employ fluted or interrupted threads for tapping performance. The fluted or interrupted regions would permit bone regeneration and thus constitute an automatic locking mechanism.

Figure 3:
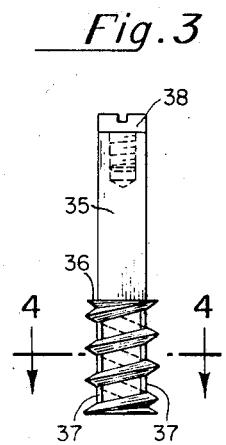
Figure 4:
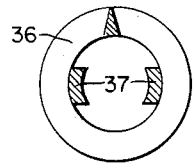

The embodiment of FIGS. 3 and 4 is similar to that of FIGS. 1 and 2 in that it involves a threaded implant post. A primary difference in the structure is the provision of a continuous threaded portion 36 about a hollow core. Two or more vertical ribs 37 extend axially from coronal portion 35 and are affixed to threaded portion 36 at points radially inwardly to provide support therefor. For attachment of copings, dentures and the like, screw 38 is shown threaded into the top of coronal portion 35.

In the case of fresh extractions implant posts such as shown in FIGS. 5, 7 and 14 may be employed. FIG. 14 depicts coronal portion 50 atop intra-osseous portion 51. The latter tapers outwardly from coronal portion 50 to provide a solid anchor upon bone regeneration. FIG. 7 depicts an eggbeater type implant post comprising coronal portion 45 atop ribs 46. Bone regeneration through and around ribs 46 provides a locking mechanism for this embodiment. The same mechanism is effective in the case of the bird cage type post of FIG. 5 which shows coronal portion 40 atop ribs 41 affixed to base ring 42.

Where it is desirable to replace a cuspid or provide cuspid implant posts as anchors for prostheses in free end saddle or edentulous situations, the embodiment of FIG. 9 is particularly applicable. FIG. 9 depicts a cuspid implant post comprising coronal portion 55 perpendicular to horizontal bar 56 from the underside of which emanates anterior pin 57 and posterior pin 58. Pins 57 and 58 are parallel to each other and in the same plane with coronal portion 55 and bar 56, the latter being intersected at acute angles. The dual pinning structure insures against rotational movement while the acute angle intra-osseous implantation serves to prevent vertical translatory movement.

The post depicted in FIG. 10 is a modification of that shown in FIG. 3. It comprises coronal portion 60 atop solid threaded portion 61 from which emanate vertical ribs 62 extending axially to ring 63 to which they are affixed. Bone regeneration through ribs 62 and ring 63 provides additional anchoring strength to that afforded by the threads of threaded portion 61. As in the case of FIG. 11 it is contemplated to accelerate bone regeneration by employing a hollow cylindrical drill to retain a core of bone between ribs 62 and ring 63.

The implant post depicted in FIG. 11 comprises a coronal portion 65 from the base of which emanates a hollow conical portion 66 preferably having an oblique apex angle. This structure caps a hollow cylindrical portion 67 having an open base. Cylindrical portion 67 may be ribbed, comprise rigid wide mesh material, or be provided with holes as shown.

The primary purpose of such construction is to permit bone regeneration through the openings of the cylinder wall to anchor the implant post. It is contemplated to effect implantation by initially drilling through the alveolar ridge with a drill shaped substantially as the implant post of FIG. 11. This drill differs structurally from its corresponding post in that an extended shank, preferably of circular cross-section, is employed in place of coronal portion 65 for use in conjunction with a chuck. The base of cylindrical portion 67 in the drill may be flared outwardly slightly and have a beveled inner edge to which an abrasive suitable for drilling bone may be affixed. An abrasive such as diamond grit is preferred. In another embodiment of such drill the base of cylindrical portion 67 may contain saw teeth to facilitate drilling through the bone. Employment of such a drill permits retention of a core of bone which fills the hollow cylindrical portion 67 thereby substantially reducing the necessary period for bone regenerative activity to lock the implant post.

The embodiment of FIGS. 12 and 13 comprises a post for use in bone having insufficient hardness to maintain threaded and other posts in a rigid state. This post comprises tubular member 70 having a plurality of ports 72 symmetrically arranged about the longitudinal axis of said member and an inner threaded portion at its upper end. The ports 72 all lie in a transverse plane intermediate the ends of tubular member 70. Spring 71 may be continuous as shown in FIG. 13 or may be interrupted. The essential feature of spring 71 is that it be adapted to seat within tubular member 70 at the transverse plane of ports 72 and to bias sections of its length through each of said ports. A coronal portion 73 is adapted to screw into the threaded portion of tubular member 70.

Figures 16, 17:
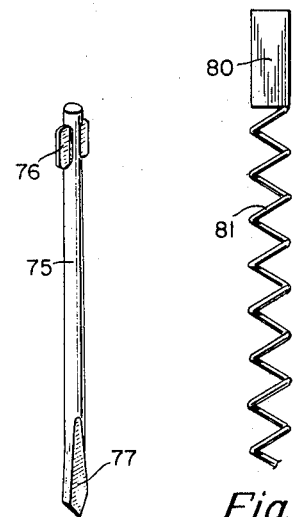
FIGS. 16 and 17 depict tapered and helical embodiments, respectively, of inventive implant pins.

Many cases calling for oral reconstruction present problems which cannot be solved by the utilization of the intra-osseous implant posts disclosed heretofore. For example, where the aforementioned implantations portend encroachment upon the superior wall of the mandibular canal or the area of the mental foramen, the danger of paresthesia is presented. Similarly, in the maxilla, penetration of the floor of the antrum must be avoided. In such problems situations the invention provides a solution in the form of the embodiments depicted in FIGS. 16 and 17. FIG. 16 shows an implant pin of circular or polygonal cross-section having a length substantially in excess of the diameter and comprising a shank 75 which joins flanged portion 76 at the upper end with a tapered, pointed tip 77 at the lower end. FIG. 17 shows an implant pin of screw or thread-like design and like the pin of FIG. 16 has a length substantially in excess of the diameter. This pin is constructed of substantially rigid material and comprises coronal portion 80 joined to threaded portion 81 having a hollow bore axially therethrough.

Figure 18:
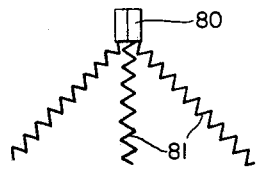
FIG. 18 depicts an oral reconstruction utilizing a plurality of the intra-osseous implant pins of FIG. 17.
Figure 19:
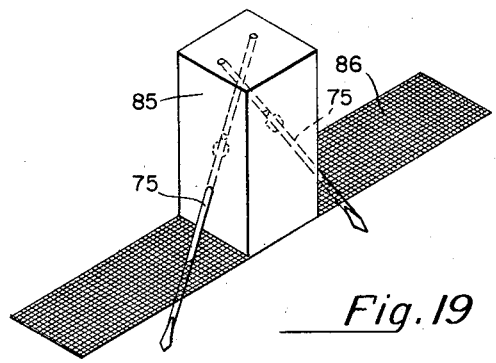
FIG. 19 depicts an oral reconstruction utilizing a plurality of the intra-osseous implant pins of FIG. 16.

The inventive implant pins provide considerable flexibility in affording intra-osseous anchors since they may be implanted at any desired angle. This advantage stems from the fact that parallelism is not dependent on the longitudinal axis of the pin. Illustrations of typical applications involving multiple pins are shown in FIGS. 18 and 19. In FIG. 18 three pins of the threaded type are shown implanted at various angles through cancellous and cortical bone material. The angles selected are designed to avoid areas insufficient in bone matter. The coronal portions of the multiple pins are rigidly joined together by a cap 80 of plastic, Teflon, or the like.

In FIG. 19, two pins of the type illustrated in FIG. 16 are shown anchoring coronal portion 85. Mesh 86 affixed to the base of coronal portion 85 is comprised of a non-corrosive, malleable metal such as tantalum and is adapted to be form fitted over the alveolar ridge beneath the mucosa.

Where the bone structure permits of undercutting the implant posts depicted in FIGS. 20 and 23 are particularly suitable. The basic post is the same in both embodiments and comprises screw 90 having a split column for ease in threading. Washer 93 is of suitable size for passage therethrough of screw 90 while retaining collar 92 which can be urged downwardly by nut 91 threaded on screw 90. From this point on the two posts differ in structure. FIG. 20 depicts a pivotally connected slide attachment for the lower portion of the post while FIG. 23 depicts pivotal fingers. Upon recourse to FIG. 21 is is seen that the slide attachment comprises carriage members 96 and 96' parallel to each other and aligned on each side of nut 101 which is threaded on screw 90. Pivotal pins 100 and 100' join carriage members 96 and 96', respectively, to nut 101 at points off center.

A bar 99 joins carriage members 96 and 96' and is so constructed and arranged that pivotal motion of said members is stopped when they are in a horizontal position as shown in FIG. 20 and also when they are pivoted counter-clockwise from the depicted position through an arc of 90 degrees to a vertical position. Slide members 95 and 95' are in flat contact with carriage members 96 and 96', respectively, and are maintained in slidable relation therewith by upper channel members 97 and 98, respectively, and lower channel members 97, 98', respectively, as shown in FIG. 22. Implantation is effected after undercutting by insertion of the FIG. 20 post with the slide attachment vertically positioned and seating washer 93 against the bone surface. The slide attachment is pivoted into horizontal position in the undercut area and slide members 95 and 95' are moved horizontally until stops 102 and 102' contact channel members 97 and 98, respectively. Nut 91 is then tightened until a firm anchor is effected. The operation is substantially the same in the case of FIG. 23 except that insertion is made with fingers 94 in a vertical position which are then pivoted horizontally in the undercut area. Fingers 94 comprise rigid metal strip members 94a connected by hinge members 94b as shown in FIG. 24. Each finger is hingedly attached to a threaded ring 94c for attachment to screw 90 as depicted in FIG. 23.

Whether posts or pins are implanted to provide an anchoring medium for oral reconstruction, there arises the problem of parallelism. FIGS. 25 and 26 provide a solution to this problem in the form of copings having telescoping arms. Copings 105 positioned on implant posts 104 are fitted with telescoping arms 106, the latter being maintained in rigid position by adjustment of set screw 107. While arms 106 may be rigidly affixed to copings 105, an adjustable connection, such as coping band 108, is preferred since desirable adjustments to obtain parallelism may be effected more easily. The adjusted device serves to provide a splint for implants and may readily carry a temporary denture base.

While the invention has been described and illustrated in connection with certain specific embodiments, it is expressly understood and will be readily apparent to those skilled in the art that various changes and modifications may be made without departing from the spirit and scope of the invention. For example, any of the inventive implant posts may be modified to permit a screw to be used with the coronal portion as shown in FIG. 2 and spacer means with or without means for carrying splints may be used in conjunction therewith. Further, it is contemplated that the inventive pins and posts may be coated with stimulants for osteoblastic activity, such as chondroitin sulfate and mucopolysaccharide extractions from irish sea moss. The technique employed for promoting bone growth in conjunction with implantation also contemplates intra-osseous injection of such stimulants through axial bores of the pins and posts as well as mucosal injection of stimulants for fibroidal activity, such as fibrochrome, through lateral bores of the implants. In addition to the use of stimulants for implant coatings, there is contemplated the use of heterogeneous bovine bone having all antigenicity removed as well as Teflon for such coatings. While it is contemplated that the materials of construction of the inventive implant posts and pins will be substantially inert with regard to oral environment and conditions, such materials do not form a part of the present invention and none is claimed therein.

We claim:
1. An implant post comprising a coronal portion rigidly affixed to and axially aligned with an intra-osseous portion, said coronal portion having a free end, and said intra-osseous portion comprising a continuous thread about a hollow core, said thread being supported by a plurality of ribs extending axially from said coronal portion and being affixed to said thread at points radially inwardly thereof, said ribs and thread defining a skeletal axially open end portion.

2. The implant post as set forth in claim 1 wherein said coronal portion has a polygonal cross-section.

3. The implant post as specified in claim 1 wherein said coronal portion has attachment means on the free end thereof for attachment of dental devices to said implant post.

4. The implant post as specified in claim 3 wherein said attachment means comprises a threaded bore extending axially into said coronal portion from the free end thereof, and a screw threaded into said bore.

5. An implant post comprising a coronal portion rigidly affixed to and axially aligned with an intra-osseous portion, said coronal portion having a free end, and said intra-osseous portion comprising an intermediate threaded portion joined to a base ring by a plurality of ribs, said ribs and base ring defining a skeletal axially open end portion.

6. The implant post as set forth in claim 5 wherein said coronal portion has a polygonal cross-section.

7. The implant post set forth in claim 5 wherein said coronal portion has attachment means on the free end thereof for attachment of dental devices to said implant post.

8. A dental implant post comprising a coronal portion rigidly affixed to and axially aligned with an intra-osseous portion, said intra-osseous portion comprising a hollow cylindrical portion having an open end opposite said coronal portion, and plural apertures extending laterally through the walls of said cylindrical portion, said plural apertures being symmetrically arranged about the longitudinal axis of said post and in a plane intermediate the ends of said cylindrical portion, and spring means adapted to be seated within said cylindrical member and to bias sections of its length through each of the apertures.

9. The implant post set forth in claim 8 wherein said coronal portion has an externally threaded base portion and said hollow cylindrical portion has an internally threaded upper portion wherein said externally threaded base portion of said coronal portion is adapted to be received via a screw connection.

References Cited
UNITED STATES PATENTS

| | | | |
|---|---|---|---|
| 744,292 | 11/1903 | Carr | 32—2 |
| 1,408,582 | 3/1922 | Gillespie | 32—2 |
| 2,112,007 | 3/1938 | Adams | 32—2 |
| 943,113 | 12/1907 | Greenfield. | |
| 2,347,567 | 4/1944 | Kresse. | |
| 1,216,683 | 2/1917 | Greenfield. | |
| 2,857,670 | 4/1956 | Kiernan. | |

FOREIGN PATENTS

| | | |
|---|---|---|
| 537,651 | 1956 | Italy. |
| 560,269 | 1957 | Italy. |

CHARLES R. WENTZEL, Primary Examiner

LOUIS G. MANCENE, Assistant Examiner

U.S. Cl. X.R.

32—10